US006561084B2

(12) United States Patent
Lane

(10) Patent No.: US 6,561,084 B2
(45) Date of Patent: May 13, 2003

(54) DEVICE FOR DRAINING A CAN OF FOOD

(76) Inventor: Richard Kenneth Lane, 2083 Betty La., Tracy, CA (US) 95377

( * ) Notice: Subject to any disclaimer, the term of this patent is extended or adjusted under 35 U.S.C. 154(b) by 0 days.

(21) Appl. No.: 09/944,976

(22) Filed: Aug. 31, 2001

(65) Prior Publication Data

US 2003/0041747 A1 Mar. 6, 2003

(51) Int. Cl.$^7$ .............................. A47J 19/06; B30B 9/06
(52) U.S. Cl. ........................... 99/508; 99/495; 100/116; 100/234
(58) Field of Search .......................... 99/495, 506, 508, 99/349; 100/110, 116, 234

(56) References Cited

U.S. PATENT DOCUMENTS 5,590,590 A * 1/1997 Zammit ...................... 99/495
6,092,460 A * 7/2000 Engelhardt .................. 99/495
6,234,074 B1 * 5/2001 Mangum .................... 100/110

* cited by examiner

Primary Examiner—Reginald L. Alexander
(74) Attorney, Agent, or Firm—Risto A. Rinne, Jr.

(57) ABSTRACT

An apparatus for draining a fluid from a can of food includes a first and second member that are pivotally attached about a common pivot axis. The first member includes a cylinder having a closed bottom and open top that is disposed proximate the pivot axis. The first member extends away from the pivot axis and includes a first handle that is distally disposed from the pivot axis. The second member includes an arcuate portion disposed above the cylinder and a third member that is pivotally attached at one end to the center of the arcuate portion. A grate is attached to the remaining end of the third member. The second member continues to extend from the arcuate portion and includes a second handle at a distal end thereof. When an opened can of food is placed in the cylinder and the first and second handles are urged together, the grate bears upon the food in the can forcing the food to the bottom of the can and displacing the fluid therefrom. Preferably, the apparatus is turned upside down to allow the fluid to drain out from the can while force is being applied to the handles.

13 Claims, 1 Drawing Sheet

DEVICE FOR DRAINING A CAN OF FOOD

BACKGROUND OF THE INVENTION

1. Field of the Invention

The present invention, in general relates to devices for draining fluid from a can of foodstuff and, more particularly, to hand-held devices that are adapted to drain the fluid content from the can while retaining the food.

For example, it is common practice to drain the water from a can of tuna before using the tuna fish to make a salad or for use in some other recipe.

The same would apply for salmon and other foodstuffs. The desired food is in the can and it is in suspension (i.e., it is mixed) with water or another type of fluid, for example, an oil such as olive oil.

The most common way currently to drain the fluid from the can while retaining the foodstuff therein is to sever the lid using a can opener and then continue to use the lid keeping it inside of the can as a member to press up into the foodstuff in the can while holding the can upside down.

This approach has many disadvantages. First, it is not effective. A great deal of pressure is required to adequately separate the fluid apart from the foodstuff. The greater the pressure, the shorter will be the time. Many people, and most housewives for example, lack sufficient strength to press the lid up into the can with their thumbs so as to effectively remove the fluid and do so quickly.

Consequently, they must retain the can in an upside down orientation for a protracted period of time and apply a nominal force. This is also tiring and it leads to another disadvantage of this process.

It is messy. The oil or water that is typically in the can flows around the fingers (usually the thumbs) that are pressing the lid up. The person must wash his or her hands and it may be especially difficult to remove the fish odor from the hands.

The net result is that people are less likely to opt to make tuna fish salad. The time and mess and odor all serve as deterrents, especially when the available time is short.

Instead, they reach for the peanut butter and jelly. It is believed by the various canned tuna fish manufacturers who recognize that if an easier and economical way to drain the fluid was available, then tuna consumption would likely increase and would do so substantially.

Another problem again relates to force. Not only is a device to drain fluid from a foodstuff such as from a can of tuna fish needed, but the device must have a mechanical advantage so that those of limited strength can effectively drain the fluid and do so in a relatively short period of time.

Another problem with using the lid as a member to press upon the food is that the lid often bends in the center if sufficient force is applied. This tends to dislodge the tuna, for example, out from the center of the can and displace it toward the can edges where it is likely to fall past the bent lid and out of the can. As the can is being held upside down so the fluid can run out, the dislodged tuna can also fall out.

Accordingly, there exists today a need for a device for draining a can of food that is convenient to use, is not messy to use, effectively drains the water or other fluid while retaining the foodstuff in the can and which provides a mechanical advantage to make doing so easier to accomplish.

Clearly, such an apparatus would be a useful and desirable device.

2. Description of Prior Art

Strainers for food are, in general, known. While the structural arrangements of the above known types of devices, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a device for draining a can of food that is easy to use.

It is also an important object of the invention to provide a device for draining a can of food that is effective at draining a fluid from the can.

Another object of the invention is to provide a device for draining a can of food that is effective at draining a fluid from the can while retaining the food in the can.

Still another object of the invention is to provide a device for draining a can of food that is adapted for draining the fluid from a can of tuna fish.

Still yet another object of the invention is to provide a device for draining a can of food that provides a mechanical advantage that increases the pressure that is applied to the food in the can.

Yet another important object of the invention is to provide a device for draining a can of food that provides a mechanical advantage that decreases the time that is required to drain the fluid from the can.

Still yet another important object of the invention is to provide a device for draining a can of food that is economical to manufacture.

Still one other important object of the invention is to provide a device for draining a can of food that is reliable.

Briefly, a device for draining a can of food that is constructed in accordance with the principles of the present invention has a longitudinal first member and a first handle disposed at a distal end thereof. A cylinder is attached to the first member at a proximate end. At an end of the cylinder that is diametrically disposed away from first member is provided a pivot axis, the pivot axis being disposed substantially perpendicular with respect to a longitudinal axis of the first member. The cylinder is open at the top and is closed at the bottom and includes an inside diameter that is greater than the outside diameter of the can of food that it is adapted to receive therein. A longitudinal second member is attached to the pivot axis at a proximate end thereof and is adapted to pivot about the pivot axis. The second member includes a raised arcuate section that extends distally from the pivot axis for a longitudinal distance that is approximately the diameter of the cylinder. The second member continues to extend longitudinally away from the pivot axis and terminates in a second handle that is equidistant from the pivot axis with the first handle. A first end of a longitudinal third member is pivotally attached to the arcuate section of the second member proximate the center of cylinder and is adapted to pivot about a second pivot axis, the second pivot axis being substantially parallel with the pivot axis. A circular grate having a smaller diameter than the inside diameter of the can of food is attached to a distal end of the third member and is adapted to enter into the can when the second member is pivoted toward the first member. The grate includes a plurality of alternating raised and lowered ridges with a plurality of holes therein. In use, the lid is removed from the can, the second member is pivoted away from the first member a sufficient amount so that the can may be placed in the cylinder with the open end of the can facing upward. The second member is urged toward the first member urging the grate to bear against the food in the can. As force is applied, the device is turned partially upside down to allow the fluid in the can to drain out, typically into a sink. The longitudinal distance from the tip of the second handle to the second pivot axis is greater than the distance from the second pivot axis to the first pivot axis, thereby providing a mechanical advantage that increases the force applied to the food in the can when a user squeezes the first and second handles toward each other.

DETAILED DESCRIPTION OF THE INVENTION

Figure 3:
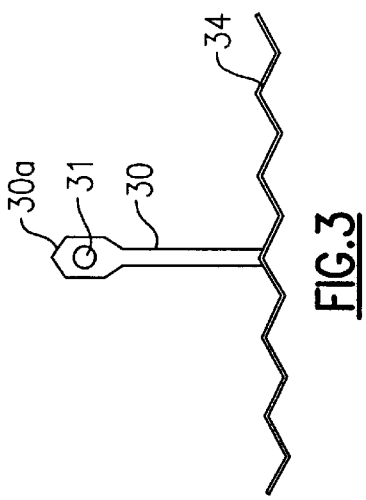
FIG. 3 is a cross sectional view taken on the line 3—3 in FIG. 2.
Figure 2:
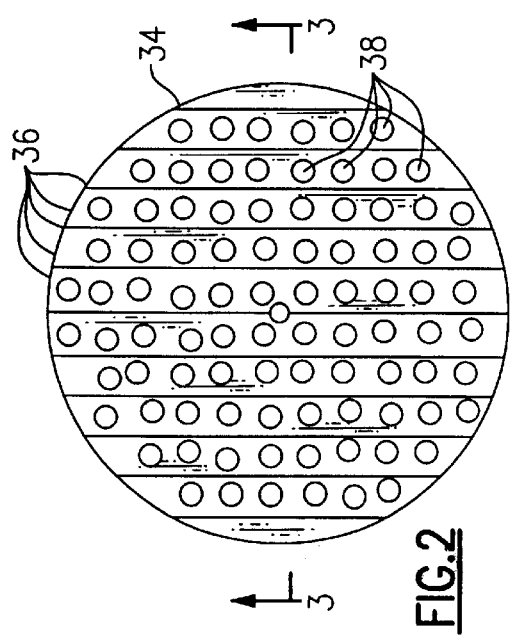
FIG. 2 is a plan view of the grate of FIG. 1.
Figure 1:
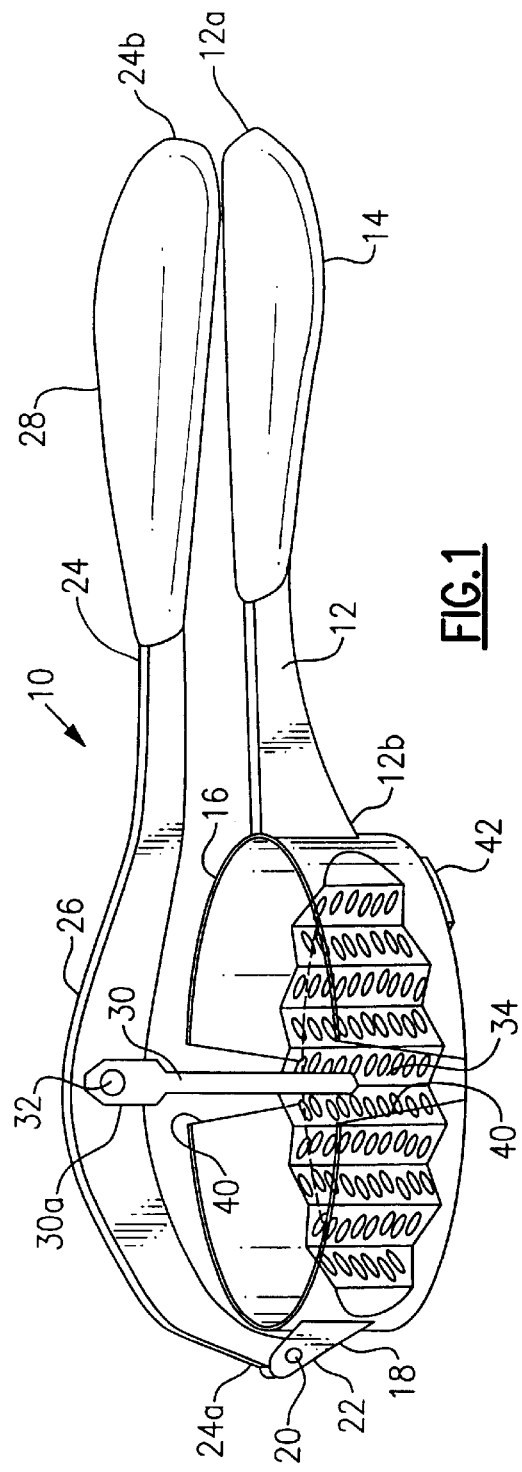
FIG. 1 is a view in perspective of a device for draining a can of food.

Referring to all of the drawings and in particular to FIG. 1 is shown, a device for draining a can of food, identified in general by the reference numeral 10.

The device 10 includes a longitudinal first member 12 and a first handle 14 disposed at a distal end 12b thereof, the first member 12 preferably extending fully the length of the first handle 14 for added strength.

A cylinder 16 is attached to the first member 12 at a proximate end 12a. At an end of the cylinder 16 that is diametrically disposed away from first member 12 is provided an angled member 18 extending therefrom.

The angled member 18 includes a pair of parallel planar members in a spaced apart relationship with respect to each other. The angled member 18 includes a distal end which has a pair of holes 20 in a spaced apart relationship that pass through each of the two planar members.

A pin passing through the pair of holes 20 provides a pivot axis 22. The pivot axis 22 is disposed substantially perpendicular with respect to a longitudinal axis passing through the first member 12.

The cylinder 16 is open at the top and is closed at the bottom and includes an inside diameter that is greater than the outside diameter of a can of food (not shown) that it is adapted to receive therein.

The angled member 18, the cylinder 16, the first member 12, and the handle together, form a longitudinal first assembly that is rigid.

A longitudinal second member 24 is pivotally attached to the pivot axis 22 at a proximate end thereof 24a and is adapted to pivot about the pivot axis 22.

The second member 24 includes a raised arcuate portion 26 that extends distally from the pivot axis 22 for a longitudinal distance that is approximately the diameter of the cylinder 16. The second member 24 continues to extend longitudinally away from the pivot axis 22 and terminates in a second handle 28 that is equidistant from the pivot axis 22 with the first handle 14.

The second member 24 similarly extends the length of the second handle 28 for added strength. The second member 24, including the arcuate portion 26 and the second handle 28, form a longitudinal second assembly that is rigid and is pivotally attached to the longitudinal first assembly. The longitudinal second assembly is adapted to pivot with respect to the longitudinal first assembly about the pivot axis.

A first end 30a of a longitudinal third member 30 is pivotally attached through a pivot hole 31 to the arcuate section 26 of the second member 24 proximate the center of cylinder 16 and it extends therefrom generally toward the cylinder 16. The third member 30 is adapted to pivot about a second pivot axis 32.

The second pivot axis 32 is substantially parallel with the pivot axis 22.

A circular grate 34 is attached to a distal end 30b of the third member 30 and it has a smaller diameter than the inside diameter of the can of food. The circular grate 34 is adapted to enter into the can when the second member 24 is pivoted toward the first member 12.

The grate 34 includes a plurality of alternating raised and lowered ridges 36 with a plurality of holes 38 therein. The plurality of alternating raised and lowered ridges 36 have been found to optimally displace the food in the can of food in such a manner (by making essentially a plurality of furrow shaped rows of compressed food that include a triangular cross-section) so that any fluid can optimally drain out from the food and pass through the plurality of holes 38. This shape also optimally retains the food in the can.

If desired, the cylinder 16 may include one or more notches 40 formed in its sides to facilitate the draining of fluid from the can.

The bottom surface of the cylinder 16 is preferably either magnetized or it contains a magnet 42. The magnet 42 is adapted to remove the lid from the can of food once it has been cut.

Operation

In use, a lid (not shown) is removed from the can. The second member 24 is pivoted away from the first member 12 a sufficient amount so that the can may be placed in the cylinder 16 with the open end of the can facing upward.

The second member 24 is urged toward the first member 12 by squeezing the handles 14, 28 together. This urges the grate 34 to bear against the food that is disposed in the can and to retain the food within the can.

As force is increasingly applied, the device 10 is turned partially upside down to allow any fluid in the can to drain out, typically into a sink (not shown).

The longitudinal distance from the tip 24b of the second handle 28 to the second pivot axis 32 is greater than the distance from the second pivot axis 32 to the first pivot axis 22, thereby providing a mechanical advantage that increases the force that is applied to the food in the can whenever a user (not shown) squeezes the first and second handles 114, 28 toward each other.

After the fluid has been drained from the can, the device 10 is turned back into an upright orientation and the second member 24 is pivoted away from the first member 12 so as to remove and then displace the grate 34 from the can sufficiently far so as to be able to remove the can from the cylinder 16.

The food in the can is now drained of the bulk of the fluid that was in the can and is suitable for use as desired. The device 10 is easily rinsed or washed, after which time it is once again ready for reuse. The device 10 can be formed of any desired suitable material including, for example, metals, plastics, woods, synthetic materials, or combinations thereof.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A device for draining a can of food, comprising:
   (a) a longitudinal first member having a proximate end and a distal end;
   (b) means adapted for retaining said can of food attached to said longitudinal first member at said proximate end and wherein said means adapted for retaining includes a cylinder, said cylinder having an open top and a closed bottom and being adapted to receive said can of food therein;
   (c) a longitudinal second member having a proximate end and a distal end, said longitudinal second member being adapted to pivot about a pivot axis with respect to said longitudinal first member at said proximate end thereof;
   (d) grate means for retaining a foodstuff in said can of food; and
   (e) means for draining a fluid from said foodstuff in said can of food.

2. A device for draining a can of food, comprising:
   (a) a longitudinal first member having a proximate end and a distal end;
   (b) means adapted for retaining said can of food attached to said longitudinal first member at said proximate end and wherein said means adapted for retaining includes a cylinder, said cylinder having an open top and a closed bottom and being adapted to receive said can of food therein and wherein said closed bottom of said cylinder is magnetized;
   (c) a longitudinal second member having a proximate end and a distal end, said longitudinal second member being adapted to pivot about a pivot axis with respect to said longitudinal first member at said proximate end thereof;
   (d) grate means for retaining a foodstuff in said can of food; and
   (e) means for draining a fluid from said foodstuff in said can of food.

3. The device of claim 2 wherein said closed bottom of said cylinder includes a magnet.

4. The device of claim 2 wherein said grate means is attached to a distal end of a third member and is disposed intermediate said longitudinal second member and said longitudinal first member and wherein said third member is pivotally attached to said longitudinal second member at a proximate end and wherein said grate means is adapted to bear upon a foodstuff in said can of food when said longitudinal second member is urged about said pivot axis toward said longitudinal first member.

5. The device of claim 4 wherein said grate means includes a circular grate.

6. The device of claim 5 wherein said circular grate includes a plurality of ridges that are in parallel spaced apart relationship with respect to each other and wherein each of said ridges includes a raised portion and a depressed portion each of which extend along the longitudinal length thereof.

7. The device of claim 5 wherein said circular grate includes a plurality of holes therein.

8. The device of claim 2 wherein said longitudinal first member includes a first handle disposed at said distal end and wherein said longitudinal second member includes a second handle disposed at said distal end.

9. The device of claim 8 wherein said longitudinal second member includes an arcuate portion that is disposed over said cylinder.

10. The device of claim 9 wherein said grate means is attached to a distal end of a third member and wherein said third member is pivotally attached to said longitudinal second member proximate the center of said arcuate portion at a second pivot axis, wherein said second pivot axis is parallel with respect to said pivot axis and wherein said grate means is adapted to bear upon a foodstuff in said can of food when said longitudinal second member is urged about said pivot axis toward said longitudinal first member.

11. The device of claim 10 wherein the distance from said distal end of said longitudinal second member to said second pivot axis exceeds the distance from said second pivot axis to said pivot axis.

12. A method for draining a fluid from a can of food, comprising the steps of:
   (a) removing a lid from the can of food;
   (b) placing the can of food on a device that is adapted for retaining the can of food and wherein said device includes:
      (1) a longitudinal first member having a proximate end and a distal end;
      (2) means adapted for retaining said can of food attached to said longitudinal first member at said proximate end and wherein said means adapted for retaining includes a cylinder, said cylinder having an open top and a closed bottom and being adapted to receive said can of food therein and wherein said closed bottom of said cylinder is magnetized;
      (3) a longitudinal second member having a proximate end and a distal end, said longitudinal second member being adapted to pivot about a pivot axis with respect to said longitudinal first member at said proximate end thereof;
      (4) grate means for retaining a foodstuff in said can of food; and
      (5) means for draining a fluid from said foodstuff in said can of food; and
   (c) urging said first member of the device to pivot about said pivot axis toward said second member sufficient so that said grate means bears upon food that is disposed in the can of food sufficient to cause at least a portion of the fluid therein to be displaced from the food.

13. A device for draining a can of food, comprising:
   (a) a longitudinal first member having a proximate end and a distal end;
   (b) means adapted for retaining said can of food attached to said longitudinal first member at said proximate end and wherein said means adapted for retaining includes a cylinder, said cylinder having an open top and a closed bottom and being adapted to receive said can of food therein and wherein said closed bottom of said cylinder includes a magnet;
   (c) a longitudinal second member having a proximate end and a distal end, said longitudinal second member being adapted to pivot about a pivot axis with respect to said longitudinal first member at said proximate end thereof;
   (d) grate means for retaining a foodstuff in said can of food; and
   (e) means for draining a fluid from said foodstuff in said can of food.

* * * * *